(12) United States Patent
Kraay et al.

(10) Patent No.: US 6,751,607 B2
(45) Date of Patent: Jun. 15, 2004

(54) SYSTEM AND METHOD FOR THE IDENTIFICATION OF LATENT RELATIONSHIPS AMONGST DATA ELEMENTS IN LARGE DATABASES

(76) Inventors: Thomas A. Kraay, 11400 Golden Leaf Cir., Manassas, VA (US) 20109-7679; Charles E. Brisbin, 13 Rutherford Cir., Sterling, VA (US) 20165-6221; Ralph Carlson, 30 Westminster Pl., Grove City, PA (US) 16127

( * ) Notice: Subject to any disclaimer, the term of this patent is extended or adjusted under 35 U.S.C. 154(b) by 324 days.

(21) Appl. No.: 09/970,253

(22) Filed: Oct. 2, 2001

(65) Prior Publication Data

US 2002/0147707 A1 Oct. 10, 2002

Related U.S. Application Data

(60) Provisional application No. 60/281,339, filed on Apr. 4, 2001.

(51) Int. Cl.$^7$ ................................................. G06F 17/30
(52) U.S. Cl. .................... 707/3; 707/1; 707/101
(58) Field of Search ................ 707/1, 2, 3, 4, 707/5, 6, 104.1, 100, 101, 102; 380/43, 46, 50, 49; 382/100; 705/64, 65, 35

(56) References Cited

U.S. PATENT DOCUMENTS

| 4,322,576 A | * | 3/1982 | Miller .......................... 380/29 |
| 5,195,136 A | * | 3/1993 | Hardy et al. ................... 380/43 |
| 5,956,717 A | | 9/1999 | Kraay et al. |
| 6,028,939 A | * | 2/2000 | Yin ............................. 713/189 |
| 6,378,073 B1 | * | 4/2002 | Davis et al. ................. 713/200 |
| 2002/0009208 A1 | * | 1/2002 | Alattar et al. ............... 382/100 |
| 2003/0018608 A1 | * | 1/2003 | Rice et al. ..................... 707/1 |

* cited by examiner

*Primary Examiner*—Charles Rones

(57) ABSTRACT

A database tool comprises a computer-implemented method for quick low-intensity processing to identify latent relationships among data elements in very large databases and to determine whether a keyword or character string is contained in a document which is part of a large collection of documents. Text in data fields of source documents are enciphered into surrogate vectors comprising wide binary numbers. Each keyword of text will set a corresponding group of bits in the associated surrogate vector. Any non-true bit required in the enciphered word is a quick indication the word cannot possibly be found in the associated document.

1 Claim, 3 Drawing Sheets

SYSTEM AND METHOD FOR THE IDENTIFICATION OF LATENT RELATIONSHIPS AMONGST DATA ELEMENTS IN LARGE DATABASES

This application claims the benefit of Provisional application No. 60/281,339 filed Apr. 4, 2001.

BACKGROUND OF THE PRESENT INVENTION

1. Field of the Present Invention

The present invention relates generally to database systems, and more particularly to systems and methods for the identification of latent relationships amongst data elements in very large computer databases.

2. Description of Related Art

Businesses, governments, agencies, and other institutions have for a long-time required various people to fill out reports and forms. The fate of many of these filings is they get forgotten. Paper forms are, in general, hard to file and access. So very often the purpose and objective in requiring the filing of forms gets lost in the impracticality of dealing with so much paper.

The Federal suspicious activity report (SAR) is a case-in-point. A SAR is required to be filed by bank officials in every instance in which some unusual financial transaction or contact has occurred. Under Title 12 Code of Federal Regulations §21 (12 CFR 21), all financial institutions operating in the United States, including insured banks, savings associations, savings association service corporations, credit unions, bank holding companies, non-bank subsidiaries of bank holding companies, Edge and Agreement corporations, and American branches and agencies of foreign banks, are required to make this report following the discovery of insider abuse involving any amount, violations aggregating $5,000 or more where a suspect can be identified, violations aggregating $25,000 or more regardless of a potential suspect, or transactions aggregating $5,000 or more that involve potential money laundering or violations of the Bank Secrecy Act.

The information provided by SAR filings across the country is invaluable to law enforcement. But the data entry, indexing and filing of paper reports results in a lot of information being lost due to misfilings, alternative wordings, misspellings, typographical errors, and other inconsistencies. So the Treasury Department, has a website (www.occ.treas.gov) that provides downloadable software for electronic filing and distribution of SAR's. To make that report, the filing institution prepares a SAR, and files it with the Financial Crimes Enforcement Network (FinCEN) of the Department of the Treasury through the IRS Detroit Computing Center. The reports are then made available electronically to appropriate law enforcement agencies.

Banks that do not wish to file electronically can continue to file paper-based reports. FinCEN has made copies of the forms available for download in Adobe Acrobat portable document format (PDF).

The FinCEN SAR database and other modern databases are proliferating in almost every area of science, technology, and society in general. Information systems are getting larger, more complex, and more important. Data mining technology has been developed that extracts useful information from databases. The identification of latent relationships among data elements in very large databases is a particularly lofty goal of current systems. This problem is made even more difficult when there are errors or variations in the type of data such as misspellings and abbreviations.

A variety of data mining methods have appeared on the commercial market in database software packages. But these prior art products are only useful when applied to small databases, where the data is pristine, and when identifying the sought-for information is comparatively straightforward. Such conventional database systems are confounded as the size of the database, the noise in the data, and the complexity of the information increases.

High-performance data mining tools take advantage of the format and structure of a given set of data. The data format and data structure are usually not subject to change. Data users must understand the data well enough to be able to identify any relationships that may exist amongst the data elements, even though the nature of such relationships may not be known beforehand. Search speeds can be improved if each database is decomposed into separate components. Once decomposed, the detection of latent relationships amongst the seemingly independent data elements becomes easier, and the speed at which the database may be searched for information can be significantly enhanced.

Many databases use fixed-width data fields, while others use a combination of fixed fields, free text and even graphic images. Fixed-field databases are the easiest to deal with, and conventional approaches to data mining may produce reasonable results provided the data is error-free. Free-text databases are more troublesome, particularly when any latent relationship information occurs in variable-width fields. Misspelled words and the use of abbreviations only complicates the job more.

SUMMARY OF THE PRESENT INVENTION

An object of the present invention is to provide a database method and system for the identification of any latent relationships amongst independent data elements in very large databases.

A further object of the present invention is to provide a database method and system for effective data mining by relatively inexperienced users.

Another object of the present invention is to provide a law enforcement tool for detecting obscure relationships and subtle activities of criminals and their organizations.

Briefly, a database method embodiment of the present invention quickly identifies latent relationships among data elements in very large databases. The database method converts each word in a document in a large database into a very wide digital-bit vector. Unique words appearing in the document are encoded into particular bits of the corresponding vector by writing ones. The possibility of a keyword being present in any document can therefore be quickly ascertained by throwing out all vectors with digital zeros in the critical bit positions that must be ones.

An advantage of the present invention is that a database search tool is provided that can scan exceedingly large databases quickly and efficiently.

Another advantage of the present invention is a data mining tool is provided that can cope with alternate spellings, misspellings, and abbreviations used for keywords in report form inputs.

These and many other objects and advantages of the present invention will no doubt become obvious to those of ordinary skill in the art after having read the following detailed description of the preferred embodiments which are illustrated in the various drawing figures.

DETAILED DESCRIPTION OF THE PRESENT INVENTION

Figure 1:
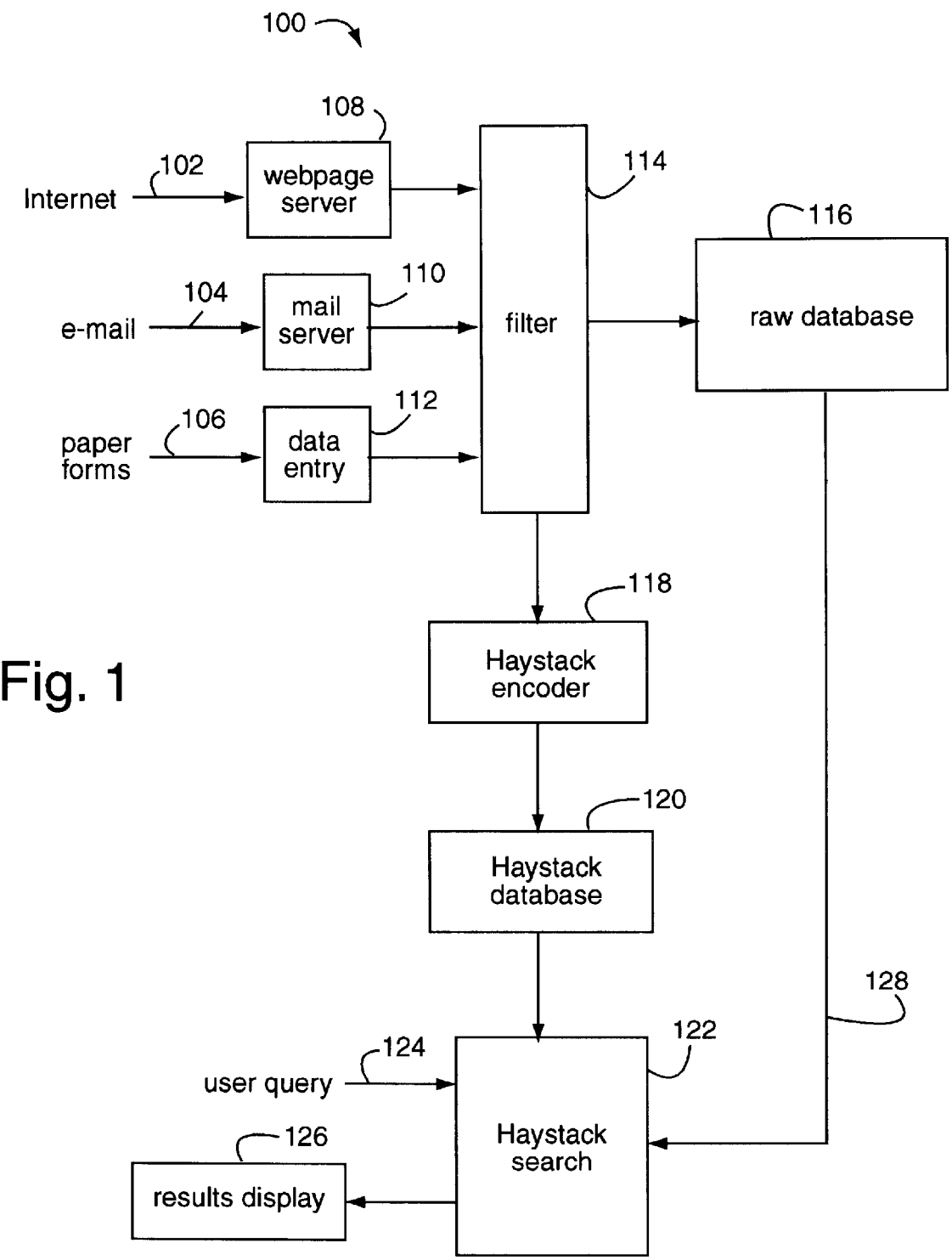
FIG. 1 is a functional block diagram of an information system embodiment of the present invention.

FIG. 1 represents an information system embodiment of the present invention, referred to herein by the general reference numeral 100. The system 100 receives information and other data from the field, e.g., government-mandated suspicious activity reports (SAR's). This information is gathered over the Internet 102, by e-mail 104, and by traditional hardcopy forms 106. The Internet interface requires a web-presence that is generated by a web-server 108. E-mail traffic is handled by a mail-server 110. The information on the paper forms is converted to electronic format by a data entry system 112.

Although the format and kind of information required from the field is dictated and is supposed to be properly structured, it frequently is not. The information being transmitted is often ad-hoc and entered under stressful circumstances. For example, alternative wordings will be used to describe the same event, especially when written by different people and coming from different parts of the world. Abbreviations and acronyms used by field personnel can also needlessly generate data variety and search complexities.

A filter 114 extracts all superfluous information and distributes the response elements in their proper categories. For example, the questions and instructions in the forms are stripped away, leaving only the responses. Each field response is defined as a document, and each document has an identifying (ID) number. The many documents are then stored in a raw database 116 and can be accessed by their ID-number. These can be accessed later by query to read the whole document as submitted by the field person.

In embodiments of the present invention, the raw database 116 will comprise an exceedingly large amount of information that will be difficult to search with prior art methods. But what is included in some documents are items that are related to similar items in other documents. The challenge and purpose of system 100 is to discover which elements of which documents are related to one another in the whole of the raw database 116.

A Haystack encoder 118 converts the text answers from filter 114 into number sets. For example, each particular word is encoded into a unique or practically unique set of positive integers between 1 and a number N. This set of integers identifies a set of bit locations in a very wide digital binary word, e.g., bits 24, 75 and 96 in a 256-bit binary word. A search for a particular word in a document reduces to the binary inspection of the corresponding bit locations in the binary representations of the words in the document. The binary representation of a document is called a (document) surrogate vector. Such searches can proceed extremely quickly, and even lend themselves to content-addressable memory systems.

The encodings are stored during preprocessing in a Haystack database 120, e.g., as field data comes in. Data mining and the discovery of any associations or relationships between documents is done on-line in response to user queries, or in batch mode.

A Haystack search tool 122 receives a user query 124 and presents easy-to-read graphic results on a results display 126. The original document contributed by the field personnel can be viewed by the user via a connection 128 to the raw database. Accessibility to the original document provides contact information for the investigator, and the whole document can be closely inspected for more subtle disclosures that are lost on the machine intelligence.

Figure 2A:
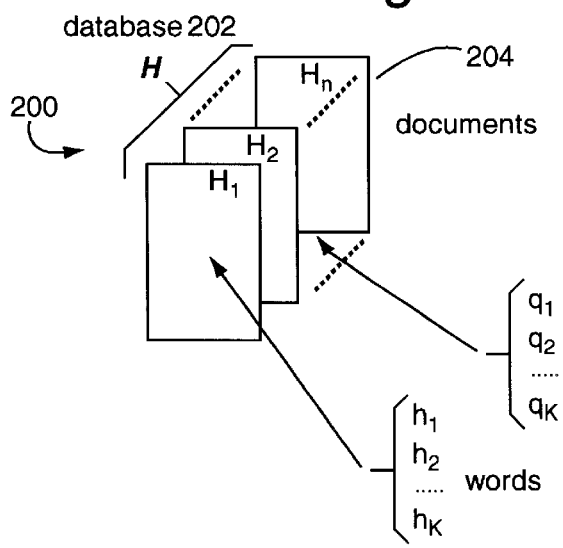
FIGS. 2A–2C are diagrams representing parts of a data mining method embodiment of the present invention.
Figure 2B:
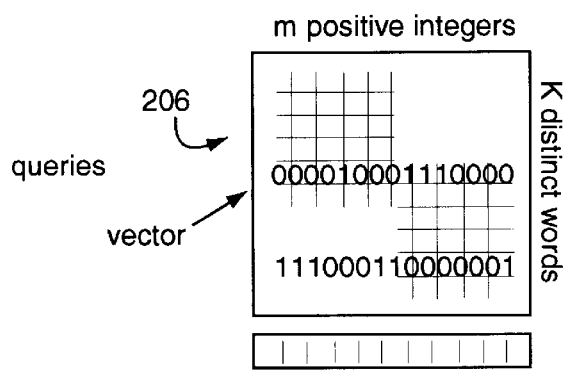
Figure 2C:
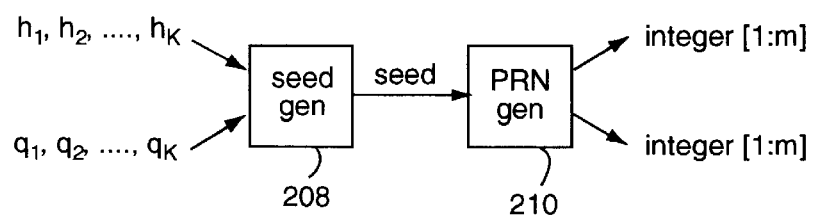

FIGS. 2A–2C represent a data-mining method embodiment of the present invention, referred to by the general reference numeral 200. Method embodiments of the present invention 200 comprises both a coding and a scanning process that operate on a database (H) 202. The coding process converts independent documents 204 into corresponding vectors, one vector for each document, and these are stored in a vector table 206. Such vectors can be very wide, e.g., thousands of binary digital bits. Each vector contains all encoded individual unique words or symbols that appear in a document. The scanning process preferably uses a computer to search for a particular keyword in a list of documents by testing each vector for the encoded word.

Referring to FIG. 2B, the length of the bit vector ("N") selected for each document and the number of bits ("m") used for encoding each word in that document will affect performance. Also, the occurrence of false hits during a search will depend on the choices for both "m" and "N".

In order to make the computer search very fast, pattern combinations of bit positions are set to ones for each unique word or symbol. The search can then proceed by discarding any vector, and therefore its corresponding document, if any of such bit positions of a keyword are zero. Any vectors found that have all the relevant bits set to one indicate a document that might have the searched-for keyword. A shortlist is created that can be inspected more closely. It can happen that two different words being encoded will both set one or more particular bit positions in the document vector to one. This leads to the possibility that several such encoded words may have combined to set all the bits of a non-existent keyword to one. These occurrences are easy to throw out with a simple inspection of the documents in the shortlist.

In FIG. 2C, a seed generator 208 and a random number generator 210 are represented as being shared by both the coding and decoding processes. Input to be coded, h1, h2, . . . hk, results in the number generator 210 outputting a set of m positive integers between 1 and N from a seed. This procedure is repeated for each distinct word in the document. A surrogate vector for the document is then produced by constructing a bit vector of length N which consists of ones in each bit location corresponding to an integer generated by the random number generator for each word in the document. A query, q1, q2, . . . , qk, is also converted to a seed and it generates a set of m positive integers between 1 and N. If the word that is being searched for is contained in the document, each bit corresponding to the m random numbers generated by the query must be a one in the surrogate vector. If any of those bits in the surrogate vector is a zero, then the word in the query cannot be in the document.

The operation of method 200 can be described mathematically. An entire database H comprises individual and independent documents $H_1, H_2, \ldots, H_n$, e.g., in a finite set.

$H = \{H_1, H_2, \ldots, H_n\}$. A query Q has an arbitrary set $q_1, q_2, \ldots, q_v$. $Q = \{q_1, q_2, \ldots, q_v\}$. The scanning step 204 therefore looks for the appearance of Q in H. In step 202, for each $H_i$, a pair of positive integers, m and N, is computed. For each distinct word in $U_i$, a set of m positive integers between 1 and N are constructed for each word in $H_i$. The union of all of the sets of m positive integers is computed. A surrogate vector for the document is constructed. The surrogate vector contains a 1 in each bit location corresponding to a number in this union. All other bit locations contain the number 0. The number of bits set to one in the surrogate vector is K where K is no larger than m times the number of distinct words in $H_i$.

To determine whether a word q is contained in document $H_i$, a set of "m" positive integers between one and "N" are generated from q. If all "m" integers generated by "q" correspond to bit locations containing a 1 in the surrogate vector for $H_i$, then the word "q" may be an element of $H_i$. If one or more of the "m" integers generated from "q" correspond to bit locations containing a 0 in the surrogate vector, then "q" is not an element of $H_i$.

A false hit occurs whenever "q" is not an element of $H_i$, but the "m" integers generated from "q" coincidentally match bits set to 1 in the surrogate vector. The probability of a false hit depends on "m" and "N", and can be readily estimated.

Figure 3:
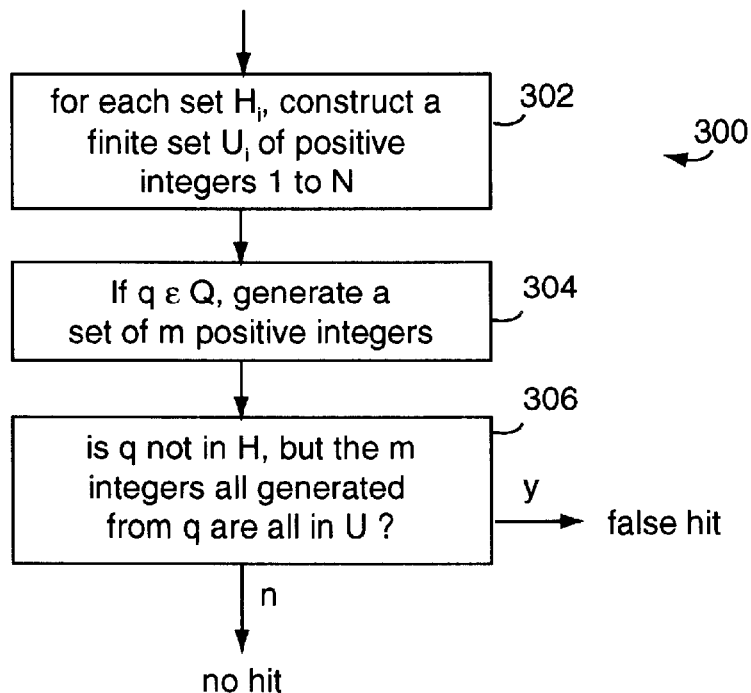
FIG. 3 is flowchart representing a computer-implemented method for fast searches of large databases for latent relationships between source documents as evidenced in the keywords used.

FIG. 3 is a flowchart representing a computer-implemented method 300 for fast searches of large databases, e.g., for latent relationships amongst source documents as evidenced in the keywords used. Embodiments of the present invention typically are used to search SAR database components, starting with the largest components first. Large components tend to identify criminal organizations, while small components tend to indicate one or two person operations. Once all the surrogate vectors have been computed for each SAR, it takes only a few seconds on a small personal computer to query the entire database.

Method 300 starts with letting $H = \{H_1, H_2, \ldots, H_n\}$ be a finite collection of finite sets, and letting $Q = \{q_1, q_2, \ldots, q_v\}$ be an arbitrary finite set. The basic problem is to determine which sets $H_1, H_2, \ldots, H_n$ if any, contain one or more elements in Q. In practical applications, H may be a collection of documents and Q may be a query in which the user attempts to identify documents that contain one or more words in the query.

Method embodiments of the present invention in general have two main operational phases, as in FIG. 3. In a first such phase 302, for each element $H_i$, a surrogate vector of length $N_i$ is constructed, where $N_i$ is a large pre-determined integer. This step is a one-time calculation of surrogate vectors that is done during preprocessing, and is completely independent of the set Q.

Once a database of surrogate vectors has been built, queries can be serviced in phase 304 to determine whether a word in the query is contained in a document. If all m integers generated by q correspond to bits set to 1 in a surrogate vector for $H_i$, then q may be an element of $H_i$.

The situation in which q is not an element of $H_i$, but the m integers generated from q are set to 1 in the surrogate vector for $H_i$, then this situation is described as a false hit. Such can be determined in a step 306. False hits can occur when the surrogate vector encoding results in ambiguities. The probability of a false hit depends upon both m and N. For each set $H_i$ a conservative estimate of the probability of a false hit can be readily computed.

Figure 4:
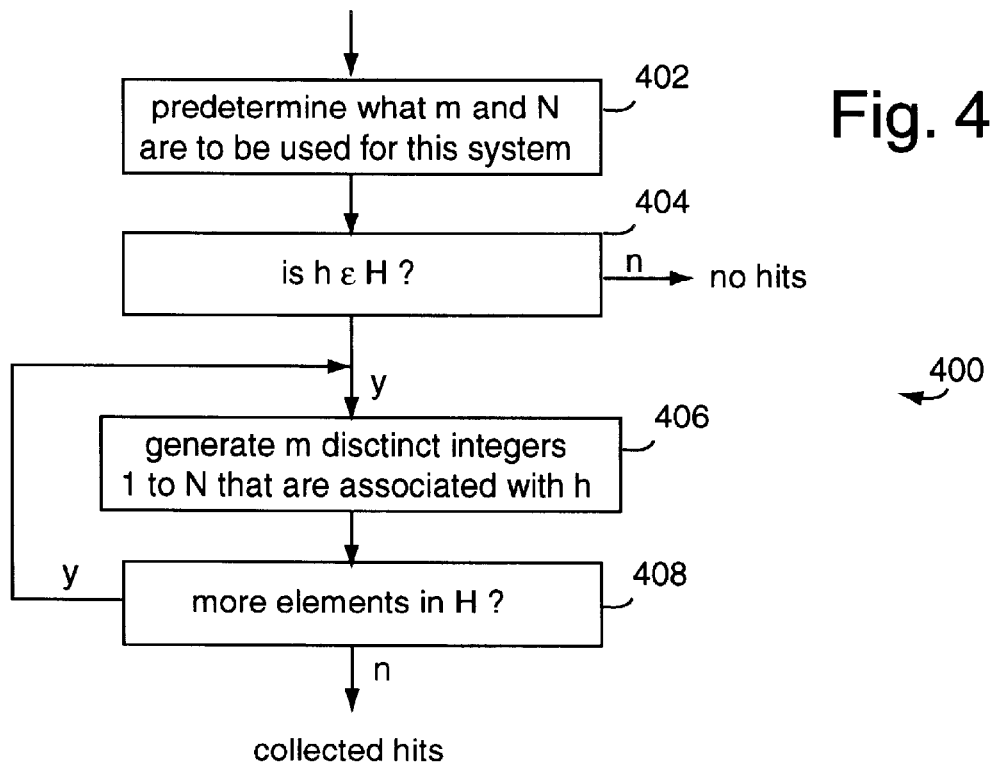
FIG. 4 is a flowchart that represents the predetermination of key variables, and an iterative generation of m distinct integers associated with h.

FIG. 4 diagrams a method for generating a finite set of m positive integers 1 to N, for each word in $H_i$ as in step 402. Let H be an arbitrary document included in H and let K be the number of distinct words in H. Appropriate values for m and N are pre-determined in a step 402. If a step 404 determines $h \in H$, then a step 406 generates m distinct integers associated with h between 1 and N. Step 406 uses a discrete random number generator to produce the m integers from a seed which is a function of the element h.

To illustrate this step, consider the case in which H is a collection of documents, and H is one document in the collection. Further, let H comprise K distinct words. So if $h \in H$, then h is a distinct word in H. An integer is generated from this word that will seed a random number generator. The process used in step 406 to generate the seed must be such that no two distinct words will generate the same seed. Otherwise, if two different words did generate the same seed, the set of m integers generated by each word would be ambiguous, and the words could not later be differentiated.

In a step 408, this process is repeated for each element in H, and U is the union of the K sets comprising of m positive integers between 1 and N. Thus, the order of U is no larger than mK. Since duplicate numbers are only counted once, the order of U may be less than mK.

The set Q represents a query, and the problem is to identify which documents (if any) contain one or more elements from Q. If q is a word in the query, compute a seed for the random number generator using the characteristics of q. Using this seed, generate a set of m integers between 1 and N. If all of these integers are in U, then q may be an element of H. If any integer in this sequence is not in U, then q cannot be in H.

The values for m and N are preselected according to the operational objectives of each particular application. The probability of a false hit depends upon m, N and K, the order of the set U. Increasing N decreases the probability of a false hit. Increasing m will increase the order of the set U, thereby increasing the probability of a false hit. However, increasing m also increases the number of conditions that must be satisfied, thereby decreasing the probability of a false hit. The optimum ratio of m to N can be derived for the set H, which is of order K. Such approach suggests that different values of m and N may be used for different sets in H.

Let $p_F$ represent the probability of a false hit for the element $q \in Q$ relative to the set H. Therefore, $p_F$ is the probability that all m integers generated by q are included in U, but q is not in H. If U contains v integers, this probability is given by, $$p_F = [(v)(v-1) \ldots (v-m+1)]/[(N)(N-1) \ldots (N-m+1)] \qquad (1)$$

If $v < N$, then it can be shown that $$p_F < (v/N)^m \qquad (2)$$

Since, $v \leq Km$, then, $$p_F \leq (Km/N)^m \qquad (3)$$

Let $p = (Km/N)^m$. For fixed values of K and N, p is a function of m. Therefore, the minimum value of p occurs when $dp/dm = 0$. Before computing $dp/dm$, the natural logarithm of both sides is taken, yielding, $$ln(p) = m[ln(K) + ln(m) - ln(N)] \qquad (4)$$

Differentiating both sides of equation (4) with respect to m yields, $$(1/p)dp/dm = m[1/m] + [ln(K) + ln(m) - ln(N)] \qquad (5)$$

Multiplying both sides by $p \neq 0$ and setting $dp/dm=0$ yields, $$1+ln(K)+ln(m)-ln(N)=0, \quad (6)$$

or, $$ln(eKm/N)=0. \quad (7)$$

Taking the exponential of both sides gives, $$eKm/N=1, \quad (8)$$

or, $$N=eKm, \quad (9)$$

Therefore, the optimum ratio for N/m is eK.

For a given probability of a false hit, the calculation of the optimal values for m and N is straightforward. If N=eKm, then, $$p=(Km/eKm)^m=e^{-m}. \quad (10)$$

To illustrate, suppose the probability $p_F$ of a false hit is set to $0.000001=10^{-6}$. Also, let U be a set with 70 elements, i.e. K=70. Since $10^{-6}=e^{-13.81551}$, set m=14. Therefore, from equation (9), N=[(e) (70) (14)]+1=2,664 where [(e) (70) (14)] represents the largest integer$\leq$e(70) (14)=2663.9161, which is 2663.

Because m and N depend upon the probability of a false hit, the probability could be set relatively high, such as 0.01 to make m and N smaller. Such could eliminate ninety-nine percent of the sets that don't include q, and would thus narrow the search. A second iteration could then be used any sets that tested positive for q. A considerably lower probability of a false hit would be present. Iterative processes have advantages in particular situations.

Method embodiments of the present invention depend on determining whether the set of m integers generated by q is included in the set U. One solution is to generate a "surrogate vector" for the set H. For a given set $H \in \mathcal{H}$, and a pre-assigned probability of a false hit, m and N can be computed.

A surrogate vector for H is preferably defined to be an N-bit vector of all zero bits, except for those bits that correspond to the integers in U. For example, as provided by a random number generator that was fed a seed value. To determine if $q \in H$, the bits corresponding to the m integers generated by q are checked. If any of the necessary bits is not set to a digital one in the surrogate vector, then q can not be in H. Digital computers can do this type of checking very rapidly.

There are two very important advantages in using surrogate vectors instead of the set H. If H were to comprise classified or sensitive information, then the surrogate vector eliminates a fear of compromise. Also, the storage requirements for surrogate vector can be considerably more compact than what would be required to store the set H.

The informational responses in SAR's include both fixed field and variable field data. Any data mining efforts to extract useful information from SAR's must accommodate both types of data fields. The data is also not very consistent. Many abbreviations are often used, along with errors in spelling. With regard to SAR's, the criminals will attempt to confound reporting by using different forms of the same name, e.g., "John Robert Smith", "John R. Smith", "J. R. Smith", "J. Robert Smith", etc. The reporting institutions also confuse data collection quite innocently, e.g., "First National Bank" may be alternatively written as "1st National Bank", "1st Nat'l Bank", "1st Nat Bk", etc.

In order to identify situations when different character strings are actually variations of the same name, a data centrifuge method is used in implementation to automatically identifies such varieties. The SAR database is decomposed into disjoint components based on relationships to each other, such as the same account number, the same phone number, the same social security number, etc. This linking of SAR's is completely new and otherwise would have been done by hand, so it wasn't previously done with much success.

Various embodiments of the present invention have been tested on a database of 4,000 SAR's with both fixed field and free text. Such SAR's were actually filed by financial institutions according to their obligations under Federal Law. Each SAR appeared to describe unrelated and independent criminal activity. A prototype embodiment of the present invention was constructed that included a computer user interface, a graphical output, and a flexible implementation. Such provided useful information in seconds that was hiding latent in the SAR-response data fields of a collected sample of real SAR's.

A user interface is preferably provided that is easy to use and intuitive. Once a query has been issued and the search routine identifies an SAR which satisfies the query, each SAR in the component containing that SAR is represented by a small hyperlink circle on a display screen. These small circles are arranged along the circumference of a large circle. The nature of the SAR and the person identified by the SAR can be readily identified by clicking on the hyperlink.

Lines are used to connect the circles to represent how different SAR's are related, e.g., social security number, telephone, address, etc. The circles are color coded to signal other characteristics and relationships. The user may print out reports that describe relationships among the SAR's and relevant information of interest to a criminal investigator. This graphical interface has proven to be an extremely effective data visualization scheme to highlight latent relationships among the data elements.

Method embodiments of the present invention are useful with databases that contain fixed field and narrative data elements. Examples of such databases are Bank Secrecy Act reports, arrest reports, court records, police records, medical records, human genome data, legal case records, and many others. Embodiments of the present invention can identify relationships between records in a wide variety of data types and applications.

In general, embodiments of the present invention can process a combination of fixed-field and free-text fields for large databases. Every such embodiment has a flexible data structure for accommodating a wide variety of data types and formats. A user friendly interface is present so that computer novices are able to learn how to extract useful information in a matter of minutes. Graphical output features that capture latent relationships and communicates those relationships in a logical, easy-to-understand format also form an integral part of the software package. $N_i$ a basic report structure that provides a written record of information obtained in the data mining process is included.

Two of the present inventors, Thomas Kraay and Charles Brisbin, describe a Database Origami in U.S. Pat. No. 5,956,717, issued Sep. 21, 1999. Method embodiments of the present inventions and systems described there are similar to those disclosed here, and so such Patent is incorporated herein by reference and referred to as "Kraay '717".

The present invention and Kraay '717 are directed to identifying relationships among the data elements. Kraay '717 gathers telephone numbers as its data elements and a metric for any relationships was computed from upon how often any two telephone numbers communicated with one another. Embodiments of the present invention find similarities amongst form field entries in different documents, e.g., to detect otherwise latent or obscure criminal behavior. However, the metric concept which is an integral part of Kraay '717 is not used here.

Database elements are decomposed into disjoint subsets. In Kraay '717, its disjoint subsets are telephone numbers that only connected with other telephone numbers within the subset. No telephone number in one subset ever connected with a telephone number in another subset. Embodiments of the present invention have disjoint subsets comprising documents that can be related, e.g., by separate suspected criminal organizations.

The data elements can be graphically represented by small circles positioned on a two-dimensional display. In Kraay '717, the logical distances between data elements was implied in the graphical display. Embodiments of the present invention skip the lengthy placement process, and place the circles equally along the circumference of a large circle in the two-dimension display field.

Kraay '717 suggested color coding the circles displayed, e.g., to identify who directly connected with whom. Embodiments of the present invention color-code the circles to identify a variety of other kinds of relationships between input documents.

Both inventions depend on a substantial one-time preprocessing step before results can be illicited. In Kraay '717, such involved computing a metric relating each pair of data elements and decomposing the data into disjoint subsets. Embodiments of the present invention preprocess to create document surrogates, and decompose the collection of documents into disjoint subsets.

The database is typically queried to extract useful information. In Kraay '717, the database queries focus on various telephone number connections to identify relationships, e.g., to find criminal organization. Embodiments of the present invention use queries to identify criminal organizations and criminal behavior, e.g., illegal drugs, loan fraud, check kiting, or other specific kind of illegal activity. Organizations operating in specific geographical regions can also be the subject of a query.

Although particular embodiments of the present invention have been described and illustrated, such is preferably not intended to limit the present invention. Modifications and changes will no doubt become apparent to those skilled in the art, and it is preferably intended that the present invention only be limited by the scope of the appended claims.

What is claimed is:

1. A method for searching database, comprising:

converting plain-language text or character string in various fields of an input document into a surrogate vector comprising a digital binary word;

translating particular plain-language words or character strings included in said text into a surrogate vector, wherein, each distinct plain-language word or character string sets a particular group of bits true in said surrogate vectors, and each surrogate vector is encoded with more that one such distinct plain-language word or character string;

generating a first numeric seed from a first plain-language word or character string in said text during a preprocessing step of building a surrogate database; generating a first set of pseudorandom numbers from said first numeric seed during said preprocessing step; generating a second numeric seed from a first query word during a search of a surrogate database for an enciphered match; generating a second set of pseudorandom numbers from a numeric seed during said query that reproduces said first set of pseudorandom numbers when said query matches said first plain-language word or character string; and recovering for inspection a corresponding said input document that originally included a word matching said query.

* * * * *